(No Model.) 2 Sheets—Sheet 1.
T. G. CONKLING.
IMPLEMENT FOR SHOCKING INDIAN CORN AND OTHER GRAIN.
No. 285,395. Patented Sept. 25, 1883.
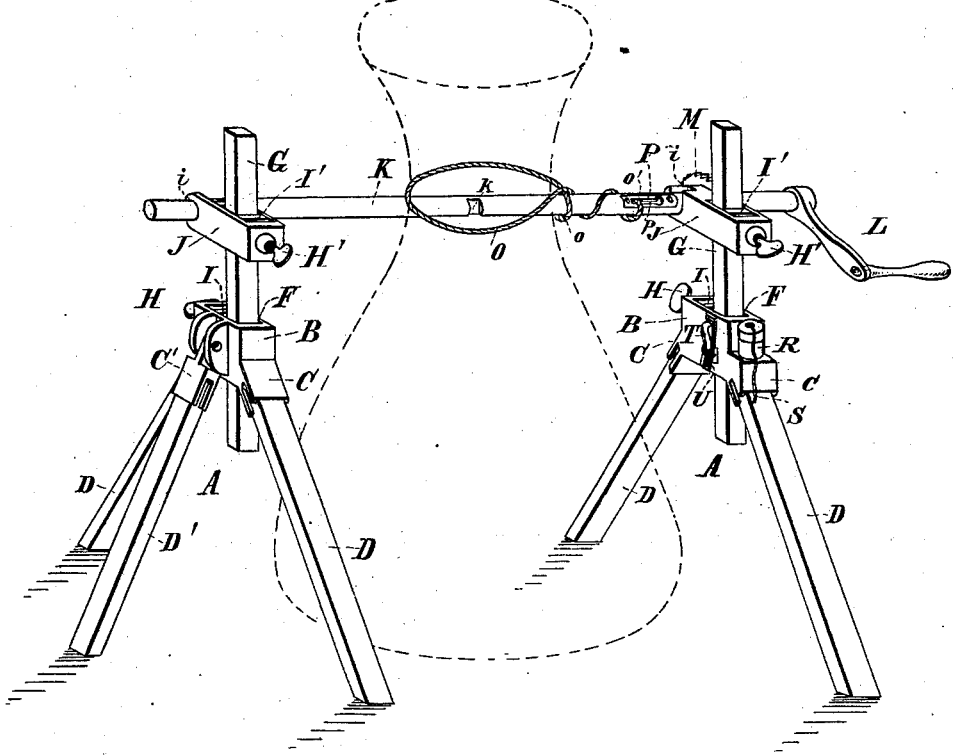
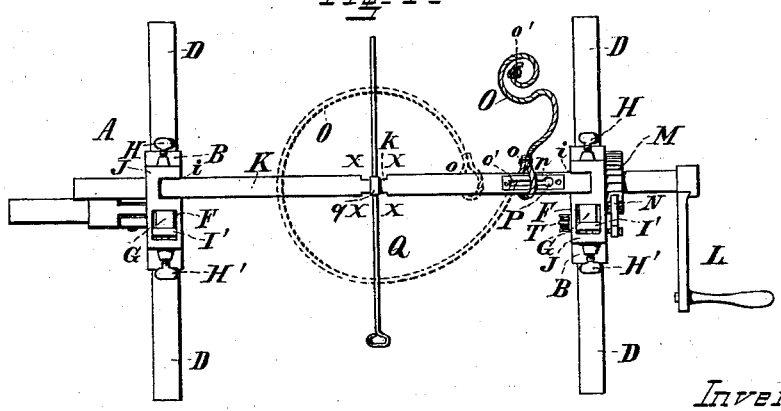
Attest
Carl Spengel
Wm. J. Jayers
Inventor
Theodore G. Conkling
by Knight Bros
Atty's (No Model.) 2 Sheets—Sheet 2.
T. G. CONKLING.
IMPLEMENT FOR SHOCKING INDIAN CORN AND OTHER GRAIN.
No. 285,395. Patented Sept. 25, 1883.
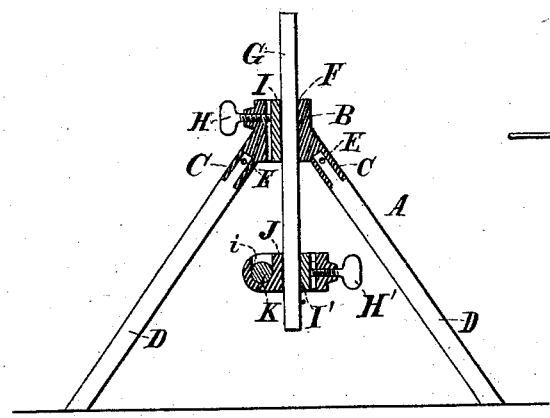
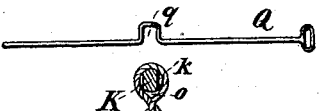
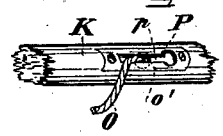
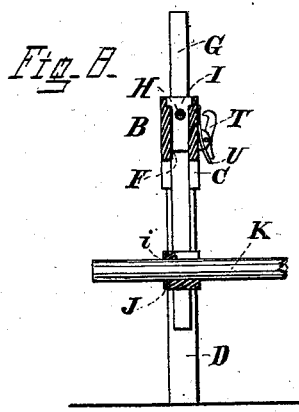
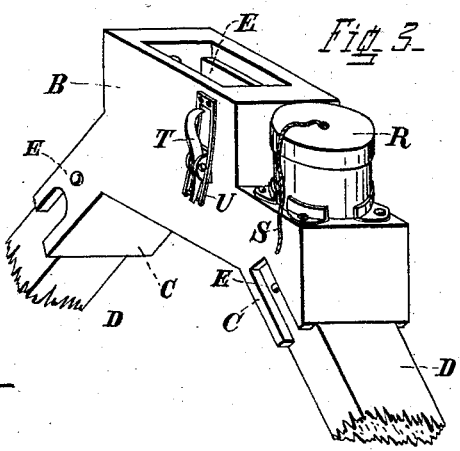
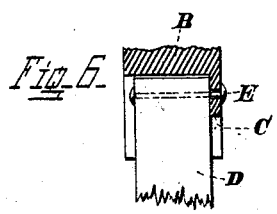
Attest
Carl Spengel
Wm. J. Sayers
Inventor
Theodore G. Conkling
by Knight Bros
Atty's

UNITED STATES PATENT OFFICE.

THEODORE G. CONKLING, OF LOGANSPORT, INDIANA.

IMPLEMENT FOR SHOCKING INDIAN CORN AND OTHER GRAIN.

SPECIFICATION forming part of Letters Patent No. 285,395, dated September 25, 1883.

Application filed December 2, 1882. (No model.)

*To all whom it may concern:*

Be it known that I, THEODORE G. CONKLING, of Logansport, Cass county, Indiana, have invented a new and useful Implement for Shocking Indian Corn and other Grain, of which the following is a specification.

My invention relates to a portable implement to facilitate the putting Indian corn and other grain into secure and properly-formed shocks in the field.

In the accompanying drawings, Figure 1 is a top view of my shocker in condition to receive the grain. Fig. 2 is a perspective view of the implement after stacking of the grain, engagement of the tightening-cord, withdrawal of the cross-rod, and partial winding of the tightening-spindle. Fig. 3 is a perspective view of one of the sockets with twine-box and severing-knife and portions of the legs. Fig. 4 represents a portion of the tightening-spindle with twine-catch. Fig. 5 shows the spindle in cross-section, with the cross-stick and a portion of the tightening-cord in profile. Fig. 6 is a sectional view to show attachment of one of the legs within its mortise. Fig. 7 is a vertical section, showing the implement adapted for binding corn-fodder, ("tops.") Fig. 8 is a vertical section at right angles to Fig. 7.

A A are two indentically-shaped stands or trestles. Each stand comprises a cast-iron socket, B, whose downwardly-oblique mortises C receive wooden legs D, which are secured in said mortises by means of riveted pins E. One socket (or both sockets) has also a pair of cheeks or additional mortise, C', on its side, for reception of a lateral oblique leg, stay, or strut, D', to prevent lateral sway of the implement and to hold it to its proper erect position. Each socket B has a vertical orifice, F, for reception of staff G, which, having been shifted to any desired height in the stand, is secured to that elevation by set-screw H and bearing-plate I.

Secured at any desired height on shaft G by means of screw and plate H' I' is a casting, J, whose cylindrical orifice *j* serves as bearing for shaft or spindle K, a wrench or crank, L, on one end of which enables its rotation at will. A ratchet, M, on said shaft takes a pawl, N, which holds the shaft at any position to which it has been rotated.

O is a cord, one end of which is looped around the shaft, as at *o*, its knotted or enlarged other end, *o'*, being capable of engagement in the key-hole-formed slotted plate or cord-catch, P.

The shaft K has a flattened portion, *k*, at or near its mid-length, to receive the cranked portion *q* of cross-rod Q.

Secured to socket B is a box, R, to hold twine S. Also, secured to socket B is a knife, T, as represented, whose point is pressed normally against the stand by means of spring U.

The implement is operated as follows: The two stands A, with the shaft K, being so placed upon the ground as to bring the flattened portion *k* of the shaft vertically over the center of the site of the intended shock, and the cross-rod Q being in position as seen in Fig. 1, the implement is now ready to receive the grain or fodder, which is stacked in four equal portions in the four re-entrant angles X, formed by the cross-rod Q and shaft K. The cord O being now brought around the grain, its knotted end *o'* is engaged in the slot *p* of catch P, and the cross-rod Q is withdrawn. The operator then, grasping the crank L, rotates the shaft K, so as to wind the cord O upon it, and by so doing to draw or bunch the grain compactly together, as shown in Fig. 2, which puts it in condition to be properly bound by the twine, of which a sufficient quantity, being drawn out of the box and cut loose by engagement with the knife T, is wound around the grain and tied. The stand nearest the operating-crank L, together with the winding-shaft K, is then drawn away from the shock and from the other stand, and the parts reunited for use in forming another shock, and so on in succession until the work is done.

For binding corn tops, the bearings J are shifted to the lower portions of the staves, as seen in Figs. 7 and 8, so as to enable the binding to be effected nearer to the butts.

The above is a time and labor saving machine. Shocks that are well formed are handled easier, in less time, and are not liable to break loose. In some parts of the country it is customary to move the shocks into rows and sow grain between. When shocked by this machine, they can be moved by simply running a stick through the shock and two men shouldering it, thus saving the use of horses.

The device enables the cutting and shocking of corn with it in high winds when it cannot be done in the ordinary way. The operator has a frame adjustable to the height of the corn, with four right-angle corners, in which to place the stalks when cut and support them properly in forming a perfect shock.

Having completed the cutting, &c., the process of binding draws the grain or stalks together in a perfect form, not leaning to one side or the other, so compact as to bend and break the stalks so much that when the bands are properly applied storms will not penetrate, and nothing less than a hurricane will blow the shocks over. The shocks being well formed and tightly bound, the stalks are much better preserved, the ears are kept from the ground, and do not get water-soaked and become worthless, as occurs to corn that has been poorly shocked or bound.

I claim as new and of my invention—

1. The grain-shocking implement comprising two stands, A, having vertical staves or posts G, carrying bearings J for a horizontal shaft or spindle, K, having flattened portion $k$ for removable cross-rod Q, and being provided with ratchet mechanism M N, and with cord O, having loop $o$, which confines one end of it to the said shaft, and having a knot or button, $o'$, at its free end for engagement in slotted catch P on the shaft, substantially as set forth.

2. In combination with stand A and post G, the vertically-adjustable bearing J for winder-shaft K.

In testimony of which invention I hereunto set my hand.

THEODORE G. CONKLING.

Attest:
GEO. H. KNIGHT,
SAMJ. S. CARPENTER.